United States Patent
Bajko et al.

(10) Patent No.: US 9,807,112 B2
(45) Date of Patent: Oct. 31, 2017

(54) METHODS, APPARATUSES, AND COMPUTER PROGRAM PRODUCTS FOR FACILITATING RANDOMIZED PORT ALLOCATION

(75) Inventors: Gabor Bajko, Mountain View, CA (US); Teemu Ilmari Savolainen, Nokia (FI); Pasi Ismo Eronen, Helsinki (FI); Lars Rene Eggert, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/143,080

(22) PCT Filed: Dec. 30, 2008

(86) PCT No.: PCT/IB2008/055589
§ 371 (c)(1),
(2), (4) Date: Jun. 30, 2011

(87) PCT Pub. No.: WO2010/076603
PCT Pub. Date: Jul. 8, 2010

(65) Prior Publication Data
US 2011/0271112 A1  Nov. 3, 2011

(51) Int. Cl.
*H04L 29/06* (2006.01)
*H04L 29/12* (2006.01)

(52) U.S. Cl.
CPC .... *H04L 63/1475* (2013.01); *H04L 29/12924* (2013.01); *H04L 61/2015* (2013.01); *H04L 61/6063* (2013.01)

(58) Field of Classification Search
CPC ........... H04L 63/1475; H04L 29/12924; H04L 61/2015; H04L 61/6063

USPC .............................................. 726/2–4, 26–30
See application file for complete search history.

(56) References Cited

U.S. PATENT DOCUMENTS

| | | | | |
|---|---|---|---|---|
| 5,465,251 A * | 11/1995 | Judd et al. | | 370/351 |
| 5,958,053 A * | 9/1999 | Denker | | H04L 67/42 709/227 |
| 6,134,591 A * | 10/2000 | Nickles | | H04L 29/06 709/217 |
| 6,502,135 B1 * | 12/2002 | Munger et al. | | 709/225 |
| 7,370,112 B2 * | 5/2008 | Saito et al. | | 709/229 |
| 7,685,342 B2 * | 3/2010 | Shiraki et al. | | 710/74 |

(Continued)

OTHER PUBLICATIONS

Henry C.J. Lee et al., "Port Hopping for Resilient Networks", Sep. 2004.*

(Continued)

*Primary Examiner* — Michael Pyzocha
(74) *Attorney, Agent, or Firm* — Mintz Levin Cohn Ferris Glovsky and Popeo, P.C.

(57) ABSTRACT

A method, apparatus, and computer program product are provided for facilitating randomized port allocation. An apparatus may include a processor configured to receive a port allocation message from a network management entity. The port allocation message may comprise an encryption key, an initial input value, and a value indicating a number of ports allocated to the apparatus for communication on a network. The processor may be further configured to calculate at least one port allocated to the apparatus with an encryption function based at least in part upon the encryption key and initial input value. Corresponding methods and computer program products are also provided.

21 Claims, 6 Drawing Sheets

(56) References Cited

U.S. PATENT DOCUMENTS

| | | | |
|---|---|---|---|
| 7,706,373 B2* | 4/2010 | Xu et al. ................... 370/392 |
| 8,301,789 B2* | 10/2012 | Morris ............... H04L 9/0841 |
| | | | 709/228 |
| 8,327,100 B2* | 12/2012 | Batifoulier et al. ......... 711/163 |
| 8,429,393 B1* | 4/2013 | Anderson et al. ........... 713/100 |
| 2003/0069981 A1* | 4/2003 | Trovato ................ H04L 29/06 |
| | | | 709/228 |
| 2004/0039938 A1* | 2/2004 | Katz ................ H04L 63/1458 |
| | | | 726/2 |
| 2004/0098485 A1* | 5/2004 | Larson et al. ............... 709/227 |
| 2004/0139228 A1* | 7/2004 | Takeda et al. .............. 709/245 |
| 2005/0018651 A1* | 1/2005 | Yan ................ H04L 29/06027 |
| | | | 370/352 |
| 2005/0083839 A1* | 4/2005 | Singh ................ H04L 12/4641 |
| | | | 370/230 |
| 2005/0105554 A1* | 5/2005 | Kagan et al. ............... 370/468 |
| 2007/0070996 A1* | 3/2007 | Oran .................... H04L 67/06 |
| | | | 370/389 |
| 2008/0168272 A1* | 7/2008 | Saito et al. .................. 713/171 |
| 2008/0313348 A1* | 12/2008 | Morris et al. ............... 709/239 |

OTHER PUBLICATIONS

Bajko, G., et al., "Port Restricted IP Address Assignment." IETF Tools. Internet Engineering Task Force, Oct. 21, 2008. Web. <https://tools.ietf.org/html/draft-bajko-v6ops-port-restricted-ipaddr-assign-01>.

Bajko, Gabor. "Port Range Proposals." IETF. IETF, Nov. 20, 2008. Web. <http://www.ietf.org/proceedings/73/slides/behave-4.pdf>.

Boucadair, M., Ed., et al., "IPv4 Connectivity Access in the Context of IPv4 Address Exhaustion: Port Range based IP Architecture." IETF Tools. Network Working Group, Jul. 3, 2009. Web. <https://tools.ietf.org/html/draft-boucadair-port-range-02>.

Larsen, M. "Port Randomization." IETF Tools. Transport Area Working Group, Aug. 31, 2008. Web. <https://tools.ietf.org/internet-drafts/draft-ietf-tsvwg-port-randomization-02.txt>.

Templin, F., Ed. "DHCP Segmentation/ Reassembly using SEAL." IETF Tools. Network Working Group, Jul. 30, 2008. Web. <https://tools.ietf.org/internet-drafts/draft-templin-dhcpmtu-01.txt>.

* cited by examiner

METHODS, APPARATUSES, AND COMPUTER PROGRAM PRODUCTS FOR FACILITATING RANDOMIZED PORT ALLOCATION

RELATED APPLICATION

This application was originally filed as PCT Application No. PCT/IB2008/055589, filed Dec. 30, 2008.

TECHNOLOGICAL FIELD

Embodiments of the present invention relate generally to communication technology and, more particularly, relate to methods, apparatuses, and computer program products for facilitating randomized port allocation.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies as well as evolved computing devices making use of networking technologies continue to facilitate ease of information transfer and convenience to users. One area in which there is a demand to further improve ease of information transfer is facilitating transmission of data over a network in a manner that inhibits blind attacks against a network host device.

In this regard, blind attacks against host devices are becoming an increasing threat in network environments. The consequences of blind attacks may include throughput reduction, broken connections, and/or data corruption. In order to protect against blind attacks, the attacker's ability to guess the five parameters that identify a transport instance must be inhibited. These five parameters include protocol, source address, destination address, source port, and destination port. In most transport instances, the protocol, source address, destination address, and destination port are fixed. Accordingly, a host device may only protect itself against blind attacks if it is able to select a random source port.

In instances in which a host device is not restricted in the ports that it may use for communication, a host device may be able to freely randomly select a port used for communication with other network devices. However, in some scenarios, a host device is port-restricted in that it is limited to use of a certain group of ports allocated to the device by a network management entity. Host devices are commonly port-restricted in situations where a network address is shared by multiple host devices, each of which is allocated a unique set of ports to ensure that the host devices sharing the same network address do not interfere with each other's communications. Allocation and use of shared port-restricted network addresses is particularly common in networks utilizing Internet Protocol version 4 (IPv4) addressing in which there is a relatively limited number of available addresses. In such scenarios, a host device is allocated a relatively small selection of ports that it may select, such as, for example, 1000 ports out of an available 64 k port range. Often, these allocated ports comprise a continuous range of ports, such as, for example, ports 1000-1999.

Allocation of a relatively small continuous range of ports makes it hard for a host device to randomly select a port to use for a transport instance so as to inhibit a blind attack as the pool of ports available to the host device comprises a relatively small number of ports in a sequential sequence. Further, allocating a continuous range of ports has privacy implications, as a connection from port X and a connection from port X+2 are likely coming from the same host device. However, allocation of a non-continuous range of ports poses problems given current port allocation methods in that a network management entity allocating ports to a host device must communicate sufficient information to the host device to enable the host device to determine which ports it has been allocated. If the network management entity randomly allocates ports to the host device and then must communicate each allocated port to the host device (e.g., by listing port 1765, port 2324, etc in the port allocation message), the port allocation message sent to the host device would be quite large. Accordingly, it would be advantageous to provide methods, apparatuses, and computer program products for facilitating randomized port allocation.

BRIEF SUMMARY OF SOME EXAMPLES OF THE INVENTION

A method, apparatus, and computer program product are therefore provided for facilitating randomized port allocation. In this regard, a method, apparatus, and computer program product are provided that may provide several advantages to computing devices, computing device users, and network providers. Embodiments of the invention facilitate randomized port allocation so as to inhibit blind attacks, even in networks where host devices are issued port-restricted network addresses shared among multiple network devices. The randomly allocated ports are cryptographically random ports, rather than easily predictable source ports within a continuous range or ranges of ports, which are more vulnerable to blind attacks. Further, embodiments of the invention enable allocation of random ports to a network host with a relatively small message size such that a host device only needs an indication of the inputs to an encryption function to enable the host device to calculate the ports allocated to the host device.

In a first exemplary embodiment, an apparatus is provided, which may include a processor configured to receive a port allocation message from a network management entity. The port allocation message may comprise an encryption key, an initial input value, and a value indicating a number of ports allocated to the apparatus for communication on a network. The processor may be further configured to calculate at least one port allocated to the apparatus with an encryption function based at least in part upon the encryption key and initial input value.

In another exemplary embodiment, an apparatus is provided, which may include a processor configured to generate an encryption key and associate the encryption key with a network address allocated to a host device. The processor may be further configured to allocate a plurality of random ports to the host device for use with the network address. The processor may additionally be configured to send a port allocation message to the host device to enable the host device to calculate the plurality of random ports allocated to the host device. The port allocation message may comprise the encryption key, an initial input value, and a value indicating a number of ports allocated to the host device.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for receiving a port allocation message from a network management entity. The port allocation message may comprise an encryption key, an initial input value, and a value indicating a number of ports allocated to the apparatus for communication on a network. The second program instruction is for calculating at least one port allocated to the apparatus with an encryption function based at least in part upon the encryption key and initial input value.

In another exemplary embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction is for generating an encryption key and associating the encryption key with a network address allocated to a host device. The second program instruction is for allocating a plurality of random ports to the host device for use with the network address. The third program instruction is for sending a port allocation message to the host device to enable the host device to calculate the plurality of random ports allocated to the host device. The port allocation message may comprise the encryption key, an initial input value, and a value indicating a number of ports allocated to the host device.

In another exemplary embodiment, a method is provided, which may include receiving a port allocation message from a network management entity. The port allocation message may comprise an encryption key, an initial input value, and a value indicating a number of ports allocated to the apparatus for communication on a network. The method may additionally include calculating at least one port allocated to the apparatus with an encryption function based at least in part upon the encryption key and initial input value.

In another exemplary embodiment, a method is provided, which may include generating an encryption key and associating the encryption key with a network address allocated to a host device. The method may further include allocating a plurality of random ports to the host device for use with the network address. The method may additionally include sending a port allocation message to the host device to enable the host device to calculate the plurality of random ports allocated to the host device. The port allocation message may comprise the encryption key, an initial input value, and a value indicating a number of ports allocated to the host device.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
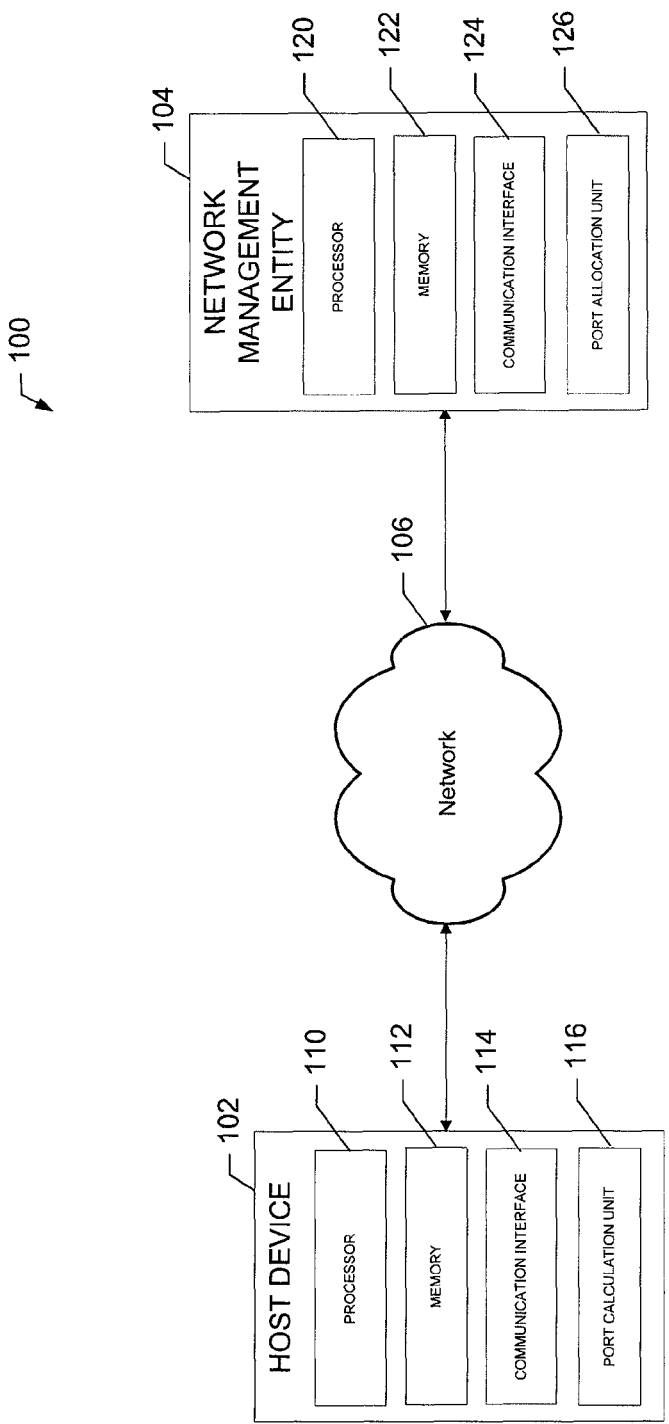
FIG. 1 illustrates a system for facilitating randomized port allocation according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for facilitating randomized port allocation according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for facilitating randomized port allocation, numerous other configurations may also be used to implement embodiments of the present invention.

In at least some embodiments, the system 100 includes a host device 102 and network management entity 104 configured to communicate over the network 106. Although only a single host device 102 and a single network management entity 104 are illustrated, the system 100 may comprise a plurality of host devices 102 and/or a plurality of network management entities 104. The network management entity 104 may be embodied as any computing device or plurality of computing devices configured to allocate ports to a host device 102 for use with a network address allocated to the host device 102 according to various embodiments of the invention. In some embodiments, a network address may comprise an internet protocol (IP)

address. However, it will be appreciated that embodiments of the invention are applicable to other types of network addresses and network communication protocols. The network management entity 104, in an exemplary embodiment, comprises a dynamic host configuration protocol (DHCP) server. However, it will be appreciated that this is merely one example embodiment of a network management entity 104. Further, embodiments of the invention are not limited to use of DHCP for use in communicating information, such as, for example, allocated ports, allocated network addresses, and/or the like between a host device 102 and network management entity 104. Accordingly, where DHCP is used herein, it is merely for purposes of example and other protocols for communicating information may be substituted. The network 106 may be embodied as any wireless network (e.g., a cellular network), wireline network, or combination thereof. In at least some embodiments, the network 106 comprises or is otherwise embodied as the Internet. The host device 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like that is configured to communicate with other devices of the system 100 over the network 106. In an exemplary embodiment, the host device 102 is embodied as a mobile terminal, such as that illustrated in FIG. 2.

Figure 2:
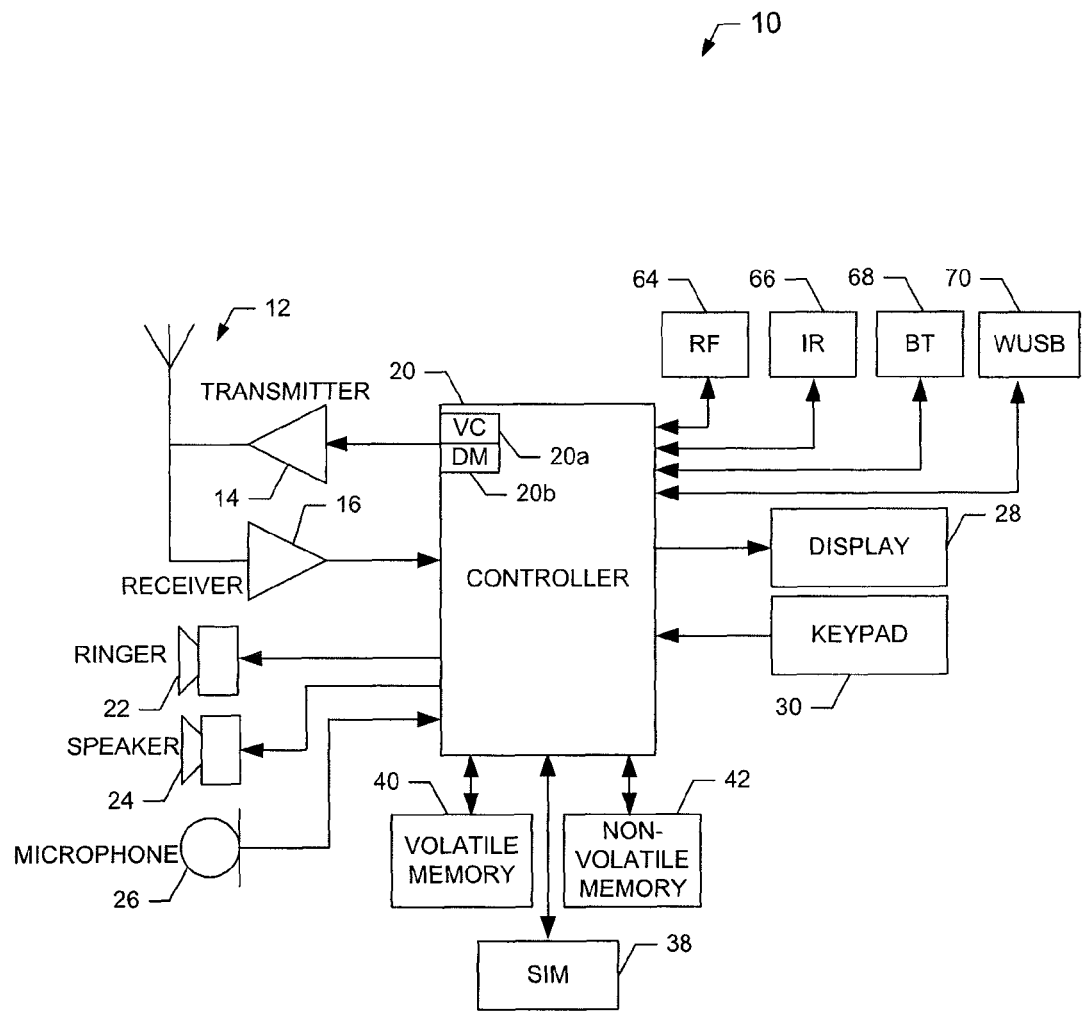
FIG. 2 is a schematic block diagram of a mobile terminal according to an exemplary embodiment of the present invention.

In this regard, FIG. 2 illustrates a block diagram of a mobile terminal 10 representative of one embodiment of a user device 102 in accordance with embodiments of the present invention. It should be understood, however, that the mobile terminal 10 illustrated and hereinafter described is merely illustrative of one type of user device 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal may also include a controller 20 or other processor(s) that provides signals to and receives signals from the transmitter and receiver, respectively. These signals may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or WiMAX protocols.

It is understood that the controller 20 may comprise circuitry for implementing audio/video and logic functions of the mobile terminal 10. For example, the controller 20 may comprise a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an exemplary embodiment, the host device 102 includes various means, such as a processor 110, memory 112, communication interface 114, and port calculation unit 116 for performing the various functions herein described. These means of the host device 102 as described herein may be embodied as, for example, hardware elements (e.g., a suitably programmed processor, combinational logic circuit, and/or the like), computer code (e.g., software or firmware) embodied on a computer-readable medium (e.g. memory 112) that is executable by a suitably configured processing device (e.g., the processor 110), or some combination thereof. The processor 110 may, for example, be embodied as various means including a microprocessor, a coprocessor, a controller, or various other processing elements including integrated circuits such as, for example, an ASIC (application specific integrated circuit) or FPGA (field programmable gate array). In embodiments wherein the host device 102 is embodied as a mobile terminal 10, the processor 110 may be embodied as or otherwise comprise the controller 20. In an exemplary embodiment, the processor 110 is configured to execute instructions stored in the memory 112 or otherwise accessible to the processor 110. Although illustrated in FIG. 1 as a single processor, in some embodiments the processor 110 comprises a plurality of processors.

The memory 112 may include, for example, volatile and/or non-volatile memory. The memory 112 may be configured to store information, data, applications, instructions, or the like for enabling the user device 102 to carry out various functions in accordance with exemplary embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may comprise one or more databases that store information in the form of static and/or dynamic information. The stored information may include data indicating ports allocated to the host device 102. This stored information may be stored and/or used by the port calculation unit 116 during the course of performing its functionalities.

The communication interface 114 may be embodied as any device or means embodied in hardware, software, firmware, or a combination thereof that is configured to receive and/or transmit data from/to a remote device, such as the network management entity 104 over the network 106. In at least one embodiment, the communication interface 114 is at least partially embodied as or otherwise controlled by the processor 110. The communication interface 114 may include, for example, an antenna, a transmitter, a receiver, a transceiver and/or supporting hardware or software for enabling communications with other entities of the system 100. The communication interface 114 may be configured to receive and/or transmit data using any protocol that may be used for communications between computing devices of the system 100. The communication interface 114 may additionally be in communication with the memory 112 and/or port calculation unit 116, such as via a bus.

The port calculation unit 116 may be embodied as various means, such as hardware, software, firmware, or some combination thereof and, in one embodiment, is embodied as or otherwise controlled by the processor 110. In embodiments where the port calculation unit 116 is embodied separately from the processor 110, the port calculation unit 116 may be in communication with the processor 110. The port calculation unit 116 may further be in communication with the memory 112 and/or communication interface 114, such as via a bus.

Referring now to the network management entity 104, in an exemplary embodiment, the network management entity 104 includes various means, such as a processor 120, memory 122, communication interface 124, and port allocation unit 126 for performing the various functions herein described. These means of the network management entity 104 as described herein may be embodied as, for example, hardware elements (e.g., a suitably programmed processor, combinational logic circuit, and/or the like), computer code (e.g., software or firmware) embodied on a computer-readable medium (e.g. memory 122) that is executable by a suitably configured processing device (e.g., the processor 120), or some combination thereof. The processor 120 may, for example, be embodied as various means including a microprocessor, a coprocessor, a controller, or various other processing elements including integrated circuits such as, for example, an ASIC (application specific integrated circuit) or FPGA (field programmable gate array). In an exemplary embodiment, the processor 120 is configured to execute instructions stored in the memory 122 or otherwise accessible to the processor 120. Although illustrated in FIG. 1 as a single processor, in some embodiments the processor 120 comprises a plurality of processors. The plurality of processors may be embodied on a single computing device or distributed across a plurality of computing devices.

The memory 122 may include, for example, volatile and/or non-volatile memory. The memory 122 may be configured to store information, data, applications, instructions, or the like for enabling the network management entity 104 to carry out various functions in accordance with exemplary embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may comprise one or more databases that store information in the form of static and/or dynamic information. The stored information may include data indicating ports allocated to one or more host devices 102. This stored information may be stored and/or used by the port allocation unit 126 during the course of performing its functionalities.

The communication interface 124 may be embodied as any device or means embodied in hardware, software, firmware, or a combination thereof that is configured to receive and/or transmit data from/to a remote device, such as a host device 102 over the network 106. In at least one embodiment, the communication interface 124 is at least partially embodied as or otherwise controlled by the processor 120. The communication interface 124 may include, for example, an antenna, a transmitter, a receiver, a transceiver and/or supporting hardware or software for enabling communications with other entities of the system 100. The communication interface 124 may be configured to receive and/or transmit data using any protocol that may be used for communications between computing devices of the system 100. The communication interface 124 may additionally be in communication with the memory 122 and/or port allocation unit 126, such as via a bus.

The port allocation unit 126 may be embodied as various means, such as hardware, software, firmware, or some combination thereof and, in one embodiment, is embodied as or otherwise controlled by the processor 120. In embodiments where the port allocation unit 126 is embodied separately from the processor 120, the port allocation unit 126 may be in communication with the processor 120. The port allocation unit 126 may further be in communication with the memory 122 and/or communication interface 124, such as via a bus.

In at least some embodiments, the port calculation unit 116 may be configured to send a message requesting that the network management entity 104 assign a network address and/or ports for use thereon to the host device 102. This request message may comprise a DHCP request, such as in embodiments wherein the network management entity 104 is embodied as a DHCP server. The request may include an indication that the host device 102 is configured to use or otherwise support a port-restricted shared network address. A port-restricted shared network address may comprise a network address allocated to multiple host devices 102, wherein each host device 102 to which the network address is allocated is limited to communication using the allocated network address with a set of allocated ports unique to each host device 102. In this regard, no two host devices 102 sharing the port-restricted shared network address may engage in network communications using the network address with a common source port. In some embodiments, the request message may comprise an explicit request for allocation of a port-restricted shared network address.

The port allocation unit 126 is configured in at least some embodiments to receive such a request from the host device 102. The port allocation unit 126 may be configured to allocate a network address to the host device 102 if one has not previously been allocated to the host device 102 and/or if the host device 102 requests assignment of a network address. The port allocation unit 126 may be configured to assign a port-restricted shared network address to the host device 102, such as in response to the host device 102 specifically requesting a port-restricted shared network address or indicating support for a port-restricted shared network address.

If the network address allocated to the host device 102 is a port-restricted shared network address or if the host device 102 is to otherwise be restricted to use of certain ports on the allocated network address (e.g., if certain ports are reserved for other uses), the port allocation unit 126 is configured to use a cryptographic mechanism to select random ports (e.g., source ports) to allocate to the host device 102. The port allocation unit 126 is configured to then send a port allocation message to the host device 102 comprising the inputs to an encryption function to enable the host device 102 to calculate the plurality of random ports allocated to the host device 102 without requiring the port allocation unit 126 to send a sizeable message specifically listing each allocated port.

In this regard, the port allocation unit 126 may be configured to deploy a cryptographic mechanism by generating an encryption key and associating the encryption key with a network address (e.g., the network address allocated to the host device 102). This encryption key is then used for allocation of ports to all host devices 102 sharing the network address with which the encryption key is associated. In at least some embodiments, the port allocation unit 126 is configured to generate a unique encryption key for each network address that it allocates to make blind attacks as difficult as possible. Thus, for example, if an attacker learns the encryption key used for a first network address, it would not be helpful in attacking a second network address that is allocated by the same network management entity 104.

The port allocation unit 126 may be further configured to select an initial input value "a" and determine a specific number of ports to allocate to the host device 102. The number of ports allocated to any one host device 102 may be determined on the basis of a default policy, such as, by allocating a predefined number of ports to each host device 102 sharing a network address. Additionally or alternatively, the port allocation unit 126 may determine the number of ports allocated to a host device 102 on the basis of a need or requirement of the host device 102 (e.g., some host devices 102 may require allocation of more ports, such as for security purposes or due to a volume of communications engaged in by the host device 102).

The port allocation unit 126 may be configured to determine the initial input value "a" based at least in part upon the number of ports allocated to the host device 102 and the basic properties of the cryptographic mechanism that facilitate random port allocation. In this regard, the encryption function used to calculate an allocated port may be represented as the function:

$y=E(K,x)$

As seen from the function, the function requires at least two inputs ("K" and "x") and results in the output "y," which represents a port allocated to a host device 102. "K" denotes the encryption key and thus remains constant for each port calculated for a given network address. The input "x" may take on any value from 1 to the number of available ports. For example, assuming that the range of ports that may be allocated to host devices 102 using a particular network address comprises 64 k ports, the value of "x" may be represented as:

$1<=x<=65536$

In some embodiments, the value of "x" may be further constrained such that the port allocation unit 126 may be configured to reserve a certain number of ports and thus may not allocate the reserved ports to a host device 102. For example, assuming the port allocation unit 126 is configured reserve 1 k ports, the range of "x" may be reduced by 1,024 and thus may, for example be represented as:

$1025<=x<=65536$

By the property of permutation, each value of "x" that is used as an input into the encryption function along with encryption key "K" will result in a unique port. Thus, the port allocation unit 126 is configured to select the initial input value "a" from the range of "x." The port allocation unit 126 is further configured to select the initial input value such that for any offset value selected from a range of values greater than or equal to zero and less than the number of ports allocated to the host device 102 added to the initial input value, a value resulting from adding the offset value to the initial input value does not coincide with a value associated with a second host device. In this regard, the range of values for the offset may be represented as any integer in the range:

$0<=\text{offset}<\text{number of ports allocated to the host device } 102$

Thus, assuming that the host device 102 is allocated 1000 ports, the value of the offset ay be represented as any integer in the range:

$0<=\text{offset}<1000$

The range of values of "x" used to calculate the 1000 ports allocated to the host device 102 for a given initial input value "a" may accordingly be represented as the series:

$E(K,a), E(K,a+1), E(K,a+2), \ldots, E(K,a+998), E(K,a+999)$

The port allocation unit 126 may be accordingly configured to determine the initial input value such that none of the range of values of "x" used to calculate ports allocated to the host device 102 coincide with a value of "x" used to calculate a port for another host device using the same network address.

For example, a second host device using the same network address may have been allocated 1000 ports using the initial input value 3000. Thus, when selecting the initial input value for the host device 102, the port allocation unit 126 must determine an initial input value such that no value in the range of values from $a<=x<=a+999$ overlaps with an integer in the range $3000<=x<=3999$. Accordingly, when the port allocation unit 126 allocates ports to a host device 102 for a certain network address, the port allocation unit 126 may be configured to store an indication of the initial input value given to the host device 102 and number of ports allocated to the host device 102 to enable determination of an initial input value for other host devices 102 to which the port allocation unit 126 subsequently allocates ports without any overlap of input values between host devices 102. Thus, when an initial input value "a" has been determined for a given host device 102 allocated the number of ports represented by "n," each value of "x" in the series of values falling in the range $a<=x<=a+(n-1)$ is associated with that host device 102.

The port allocation unit 126 may accordingly be configured to send a port allocation message comprising the encryption key ("K") determined initial input value ("a"), and an indication of the number of ports allocated to the host device 102 ("n," e.g., 1000 in the above example). These values then enable the host device 102 to calculate each port allocated to the host device 102 using an encryption function $y=E(K,x)$. Accordingly, the port allocation unit 126 may send messages having a relatively small size but still allocate random ports to the host device 102 because the encryption function enables use of an assigned continuous range of integer input values (e.g., $a<=x<a+n$) to allocate random ports using an encryption function. The encryption function may, for example, be predefined and known to the host device 102, provided to the host device 102, or may be negotiated with the host device 102. In this regard, the port allocation message may comprise an indication of an encryption function to be used to calculate ports allocated to the host device 102 if the encryption function is not predefined and/or previously negotiated between the host device 102 and network management entity 104. This indication may comprise the actual encryption function, or may identify an encryption function to use. Accordingly, the port allocation unit 126 may be configured to determine and/or define an encryption function to be used for allocation of ports to a host device 102 and for calculation of allocated ports by the host device 102 and indicate that encryption function to the host device 102 through the port allocation message. In some embodiments, the port allocation unit 126 is configured to negotiate an encryption function with the host device 102 (e.g., prior to calculating ports allocated to the host device 102). The negotiation may take place as described above using the port allocation message, or may comprise negotiation using one or more messages exchanged with the host device 102 prior to sending the port allocation message. If not already known to the host device 102, the port allocation message may further comprise the network address allocated to the host device 102.

In some embodiments, the port allocation message may comprise a DHCP response message, such as in embodiments wherein the network management entity 104 is embodied as a DHCP server communicating with the host device 102 in accordance with DHCP. For example, in an embodiment wherein the network management entity 104 comprises a DHCP server configured to allocate a port-restricted shared IPv4 address, the port allocation message may adhere to the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| option code   |    length     |  IPv4 address                 ...
+-+-+-+-+-+-+-+-+-+-+-+-+-+-+-+-+-+-+-+-+-+-+-+-+-+-+-+-+-+-+-+-+
... IPv4 address               |        starting point          |
+-+-+-+-+-+-+-+-+-+-+-+-+-+-+-+-+-+-+-+-+-+-+-+-+-+-+-+-+-+-+-+-+
|     number of ports   n      |          key K                ...
+-+-+-+-+-+-+-+-+-+-+-+-+-+-+-+-+-+-+-+-+-+-+-+-+-+-+-+-+-+-+-+-+
...                                                            ...
+-+-+-+-+-+-+-+-+-+-+-+-+-+-+-+-+-+-+-+-+-+-+-+-+-+-+-+-+-+-+-+-+
...                                                            ...
+-+-+-+-+-+-+-+-+-+-+-+-+-+-+-+-+-+-+-+-+-+-+-+-+-+-+-+-+-+-+-+-+
...                                                            ...
+-+-+-+-+-+-+-+-+-+-+-+-+-+-+-+-+-+-+-+-+-+-+-+-+-+-+-+-+-+-+-+-+
... key K                      |
+-+-+-+-+-+-+-+-+-+-+-+-+-+-+-+-+
```

In embodiments wherein the network management entity 104 comprises a DHCP server and the port allocation unit 126 is configured to negotiate an encryption function with the host device 102 using the port allocation message, the port allocation message may adhere to the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| option code   |    length     |  IPv4 address                 ...
+-+-+-+-+-+-+-+-+-+-+-+-+-+-+-+-+-+-+-+-+-+-+-+-+-+-+-+-+-+-+-+-+
... IPv4 address               |  ver  |   E   |    reserved   |
+-+-+-+-+-+-+-+-+-+-+-+-+-+-+-+-+-+-+-+-+-+-+-+-+-+-+-+-+-+-+-+-+
|        starting point        |     number of ports   n       |
+-+-+-+-+-+-+-+-+-+-+-+-+-+-+-+-+-+-+-+-+-+-+-+-+-+-+-+-+-+-+-+-+
|    key K                                                     ...
+-+-+-+-+-+-+-+-+-+-+-+-+-+-+-+-+-+-+-+-+-+-+-+-+-+-+-+-+-+-+-+-+
...                                                            ...
+-+-+-+-+-+-+-+-+-+-+-+-+-+-+-+-+-+-+-+-+-+-+-+-+-+-+-+-+-+-+-+-+
...                                                            ...
+-+-+-+-+-+-+-+-+-+-+-+-+-+-+-+-+-+-+-+-+-+-+-+-+-+-+-+-+-+-+-+-+
... key K                                                      |
+-+-+-+-+-+-+-+-+-+-+-+-+-+-+-+-+-+-+-+-+-+-+-+-+-+-+-+-+-+-+-+-+
```

In this regard, the port allocation unit 126 may fill the "ver" and/or "E" fields with information indicating which encryption function is to be used for calculating ports allocated to the host device 102.

In some embodiments, the port allocation unit 126 may be further configured to store a port allocation table in a memory, such as the memory 122. In such embodiments, the port allocation unit 126 may be configured to calculate each port allocated to the host device 102 (e.g., sequentially, or otherwise) using the encryption function with the range of input values associated with the host device 102 and store an indication of each allowed port in the port allocation table in association with the host device 102 to indicate that the port was allocated to the host device 102. Calculating a port allocation table at the network management entity 104 is not necessary, but a port allocation table may be used to verify communications sent by a host device 102 to ensure validity and/or to ensure compliance by the host device 102 in using only those ports allocated to the host device 102. Further, the port allocation unit 126 may calculate and/or update the port allocation table at any time, including preceding or following sending the port allocation message to the host device 102.

The port calculation unit 116 of the host device 102 is configured to receive the port allocation message and calculate one or more ports allocated to the host device 102 based at least in part upon the encryption key and initial input value included in the port allocation message. In this regard, the port calculation unit 116 may be configured to calculate each port allocated to the host device 102 upon receipt of the port allocation message, or may calculate some subset thereof. Further, the port calculation unit 116 may, in some embodiments, calculate an allocated port on the fly, such as when the port calculation unit 116 is to use the port for communication over the network 106. The port calculation unit 116 may store each calculated port in the memory 112, such as in a port allocation table including a listing of ports allocated to the host device 102.

In embodiments wherein the encryption function is predefined and/or has been previously negotiated (e.g., at time of manufacture of the host device 102, when the host device 102 initially accesses the network 106, when the host device 102 first communicates with the network management entity 104, or the like), the port calculation unit 116 may be configured to utilize the predetermined encryption function, which may also be known to the network management entity 104 and/or other host devices 102 in the system 100. In embodiments wherein the encryption function is not predefined and/or has not been previously negotiated, the received port allocation message may comprise an indication of an encryption function to use. This indication may comprise the actual encryption function, or may identify an encryption function to use. If the received port allocation message comprises the encryption function, then the port calculation unit 116 may be configured to extract the encryption function from the port allocation message. If the port allocation message comprises an indication identifying the encryption function to use, the port calculation unit 116 may be configured to utilize the indication to retrieve the identified encryption function, such as from the memory 112 or from another device, such as may be accessible over the network 106 (e.g., the network management entity 104). In some embodiments, the port calculation unit 116 is configured to negotiate an encryption function with the network management entity 104. Accordingly, the port calculation unit 106 may be configured to send a message comprising an indication of one or more encryption functions supported by the port calculation unit 106 to the network management entity 104 to enable negotiation of an encryption function.

Once the port calculation unit 116 has determined the encryption function to use (e.g., predetermined encryption function, negotiated encryption function, or encryption function indicated in the port allocation message), the port calculation unit 116 may calculate one or more ports allocated to the host device 102 using the information included in the port allocation message. Accordingly, the port calculation unit 116 may calculate a port using an encryption function expressed as:

y=E(K, x)

for each integer value "x" in the range:

a<=x<a+n wherein a and n are indicated as the initial input value and the number of ports allocated to the host device 102, respectively, in the port allocation message. Accordingly, the port calculation unit 116 may be configured to determine an integer offset value in the range 0<=offset<n and add that offset value to the initial input value to calculate each input value "x" used to calculate a port with the encryption function.

It will be appreciated that the encryption function may comprise any appropriate encryption function that facilitates random allocation of ports as described herein. For port randomization, the encryption function of one embodiment should comprise a function whose input and output is an integer in a range representative of the number of ports which are allocable for a given network address. For example, if the first 1 k ports are reserved and there are 64 k total ports, the integer range of the input and output may comprise: 1024 . . . 65535.

One possible encryption function is the "Generalized-Feistel Cipher" construction by Black and Rogaway (John Black and Phillip Rogaway: "Ciphers with Arbitrary Finite Domains", Topics in Cryptology—CT-RSA 2002, Lecture Notes in Computer Science vol. 2271, 2002), with Advanced Encryption Standard (AES) as the underlying round function. For example, the pseudo-code for such a construct may be represented as:

```
def E(k, x):
    y = Feistel16(k, x)
    if y >= 1024:
        return y
    else:
        return E(k, y)
```

Note that although E(k,x) is recursive, it is guaranteed to terminate. The average number of iterations is just slightly over 1.

Feistel 16 is basically a 16-bit block cipher:

```
def Feistel16(k, x):
    left = x & 0xff
    right = x >> 8
    for round = 1 to 3:
        temp = (left + FeistelRound(k, round, right)) & 0xff
        left = right
        right = temp
    return (right << 8) | left
```

The Feistel round function uses

```
def FeistelRound(k, round, x):
    msg[0] = round
    msg[1] = x >> 8
    msg[2] = x & 0xff
    msg[3...15] = 0
    return AES(k, msg)
```

Figure 3:
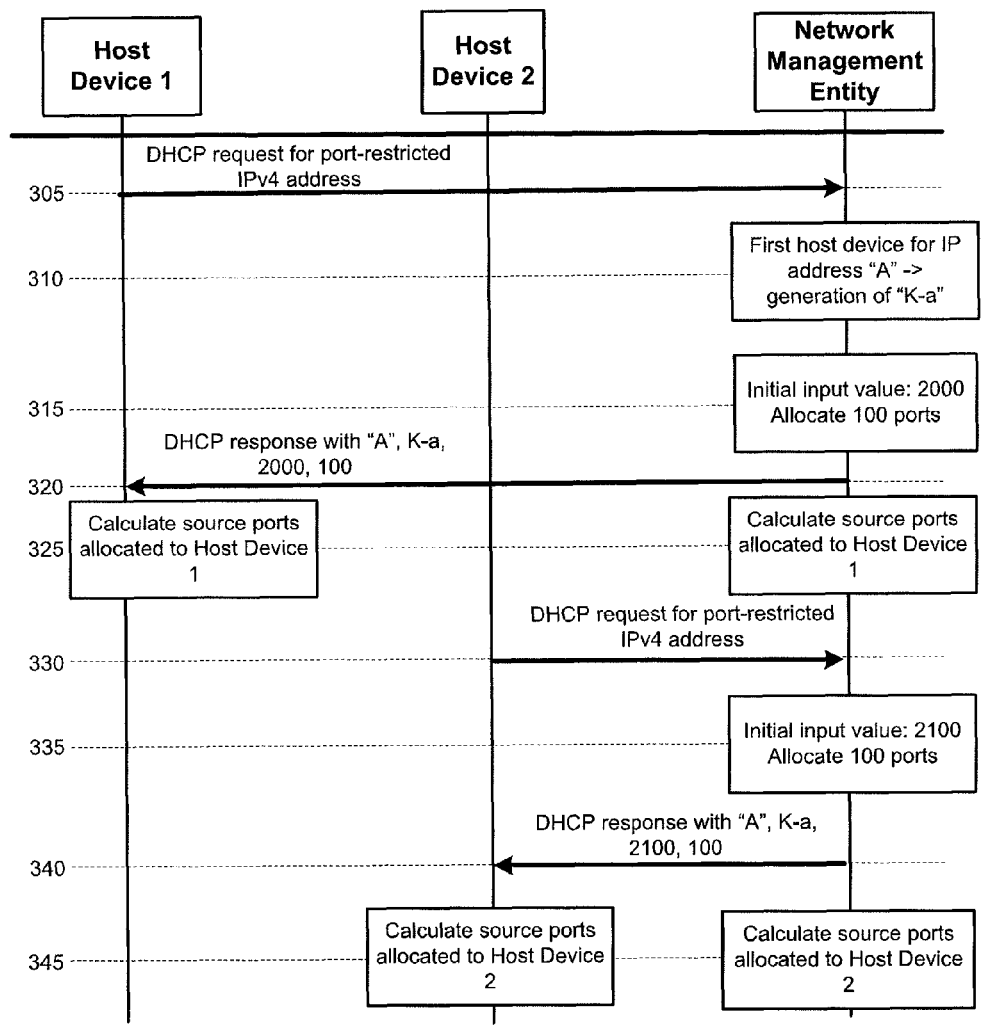
FIG. 3 is a message flow chart illustrating allocation of randomized ports for a port-restricted network address according to an exemplary embodiment of the present invention.

FIG. 3 is a message flow chart illustrating allocation of randomized ports for a port-restricted network address according to an exemplary embodiment of the present invention. In this regard, FIG. 3 illustrates a message flow chart for a system comprising two host devices 102 ("Host Device 1" and "Host Device 2") sharing a single port-restricted IPv4 address allocated by a network management entity. It will be appreciated, however, that as previously stated, port-restricted shared network addresses represent only one application for embodiments of the present invention and accordingly, embodiments of the invention may be applied to any situation wherein a host device 102 is allocated a random subset of ports for use with a network address by a network management entity 104. Further, IPv4 addresses are only one example of a type of network address to which embodiments of the invention may be applied for allocating random ports to a host device 102.

Referring again to the message flow of FIG. 3, operation 305 comprises the port calculation unit 116 of Host Device 1 sending a DHCP request for a port restricted IPv4 address to the network management entity. Operation 310 comprises the port allocation unit 126 allocating the IPv4 address "A" to Host Device 1, which is the first host device to which "A" has been allocated. Operation 305 further comprises the port allocation unit 126 generating the encryption key "K-a" and associating "K-a" with the address "A." Operation 315 comprises the port allocation unit 126 allocating 100 ports to Client 1 and determining an initial input value of 2000. Operation 320 comprises the port allocation unit 126 sending a DHCP response comprising a port allocation message comprising the address "A," the encryption key "K-a," the initial input value "2000," and the number of allocated ports "100" to Host Device 1. Operation 325 may optionally comprise the port allocation unit 126 calculating the source ports allocated to Client 1 using the encryption function and storing the allocated source ports in a port allocation table. Operation 325 further comprises the port calculation unit 116 of Host Device 1 using the values received in the port allocation message to calculate one or more source ports allocated to the Host Device 1 with the encryption function.

Operation 330 may then comprise the port calculation unit 116 of Host Device 2 sending a DHCP request for a port restricted IPv4 address to the network management entity. Operation 335 comprises the port allocation unit 126 allocating the IPv4 address "A" to Host Device 2, such that it is shared between Host Device 1 and Host Device 2. Operation 335 further comprises the port allocation unit 126 allocating 100 ports to Host Device 2 and determining an initial input value of 2100 (e.g., the range of input values associated with Host Device 1 was 2000 . . . 2099 and thus no input value associated with Host Device 1 coincides with an input value associated with Host Device 2 given the initial input value of 2100). Operation 340 comprises the port allocation unit 126 sending a DHCP response comprising a port allocation message comprising the address "A," the encryption key "K-a," the initial input value "2100," and the number of allocated ports "100" to Host Device 2. Operation 345 may optionally comprise the port allocation unit 126 calculating the source ports allocated to Host Device 2 using the encryption function and storing the allocated source ports in the port allocation table for address "A," which may also include source ports allocated to Host Device 1. Operation 345 further comprises the port calculation unit 116 of the Host Device 2 using the values received in the port allocation message to calculate one or more source ports allocated to Host Device 2 with the encryption function.

Figure 4:
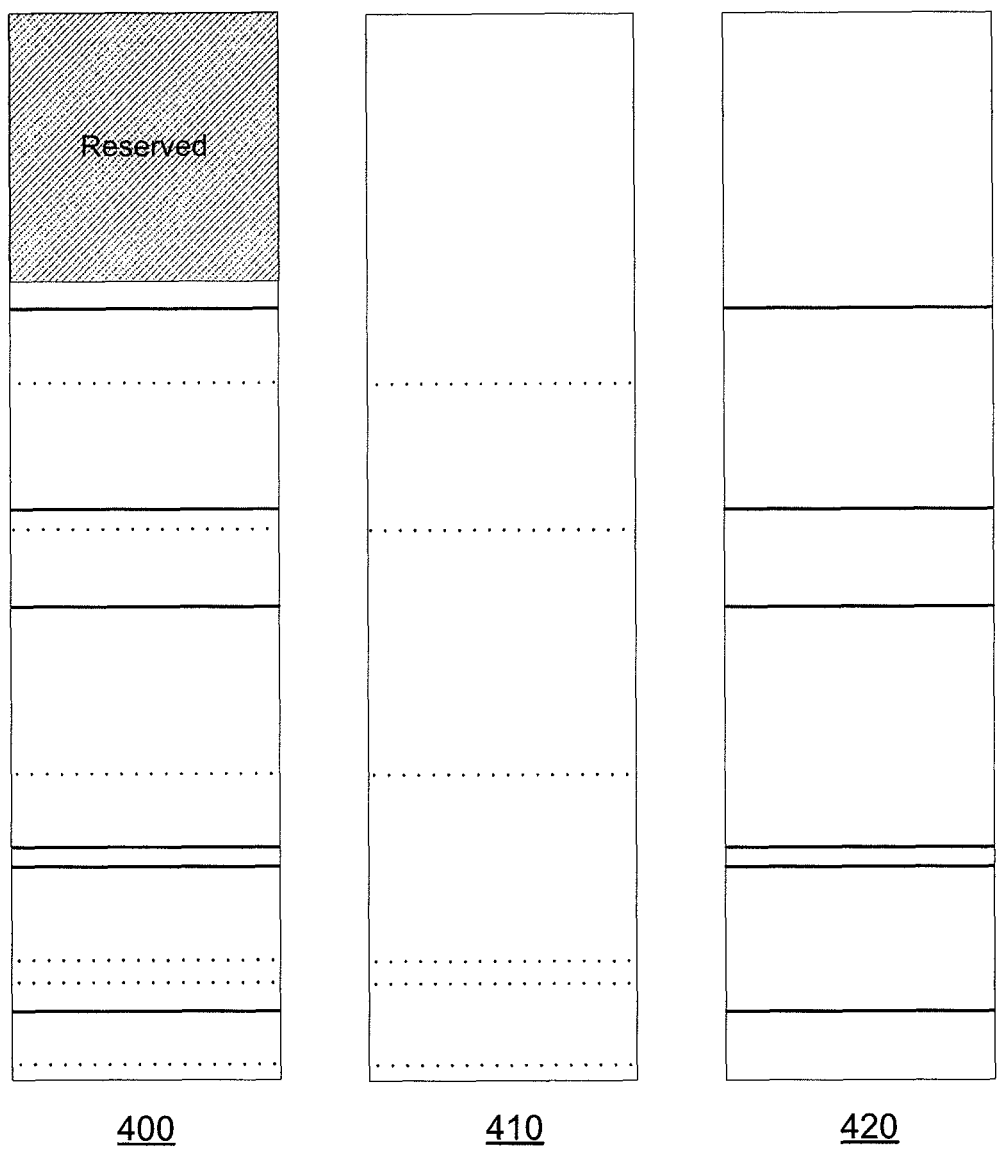
FIG. 4 illustrates a series of port allocation diagrams following allocation of randomized ports for a port-restricted network address according to an exemplary embodiment of the present invention.

FIG. 4 illustrates a series of port allocation diagrams following allocation of randomized ports for a port-restricted network address as described in the scenario of FIG. 3 according to an exemplary embodiment of the present invention. In this regard, FIG. 4 illustrates how the server may have randomly allocated a first set of source ports to Host Device 1 and a second set of source ports to Host Device 2. Accordingly, the port allocation diagram 400 illustrates the port space as seen by the server wherein a first block of ports is reserved and thus not allocable to any client, a first set of source ports illustrated with dotted lines are allocated to Host Device 1, and a second set of source ports illustrated with solid lines are allocated to Host Device 2. The port allocation diagram 410 illustrates the set of source ports allocated to Host Device 1, which the port calculation unit 116 of Host Device 1 has calculated and knows to be allocated to Host Device 1. Similarly, the port allocation diagram 420 illustrates the set of source ports allocated to Host Device 2, which the port calculation unit 116 of Host Device 2 has calculated and knows to be allocated to Host Device 2.

Figure 5:
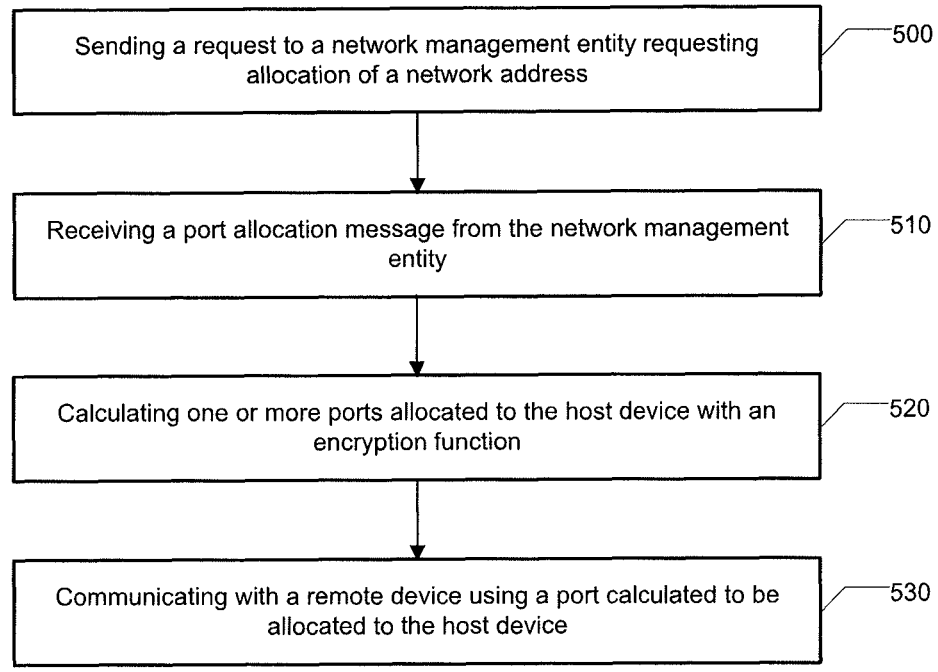
FIGS. 5-6 are flowcharts according to an exemplary method for facilitating randomized port allocation according to an exemplary embodiment of the present invention.
Figure 6:
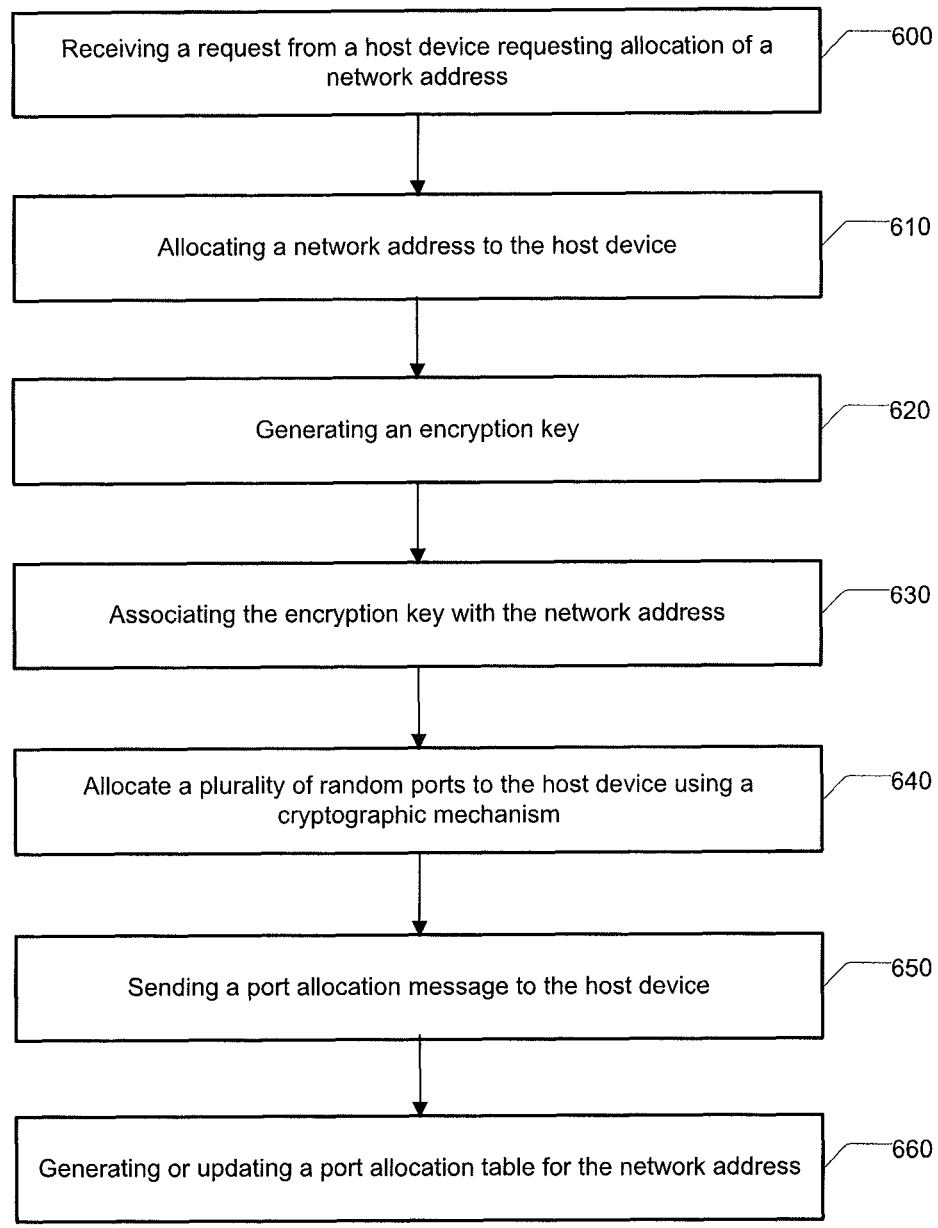

FIGS. 5-6 are flowcharts of a system, method, and computer program product according to exemplary embodiments of the invention. It will be understood that each block or step of the flowcharts, and combinations of blocks in the flowcharts, may be implemented by various means, such as hardware, firmware, and/or software including one or more computer program instructions. For example, one or more of the procedures described herein may be embodied by computer program instructions. In this regard, the computer program instructions which embody the procedures described herein may be stored by a memory device of a mobile terminal, server, or other computing device and executed by a processor in the computing device. In some embodiments, the computer program instructions which embody the procedures described above may be stored by memory devices of a plurality of computing devices. As will be appreciated, any such computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

In this regard, one exemplary method for facilitating randomized port allocation according to an exemplary embodiment of the present invention is illustrated in FIG. 5. In this regard, FIG. 5 illustrates operations that may occur at a host device 102. The method optionally includes the port calculation unit 116 sending a request to a network management entity 104 requesting allocation of a network address to the host device 102, at operation 500. Operation 510 comprises the host device 102 receiving a port allocation message from the network management entity 104. The port allocation message may comprise an encryption key, an initial input value, and a value indicating a number of ports allocated to the host device 102. The port allocation message may further comprise a network address allocated to the host device 102. Operation 520 comprises the port calculation unit 116 calculating one or more ports allocated to the host device with an encryption function based at least in part upon the encryption key and initial input value included in the port allocation message. The port calculation unit 116 may further store one or more calculated ports in the memory 112, such as in a port allocation table. Operation 530 comprises the port calculation unit 116 and/or communication interface 114 using a port calculated to be allocated to the host device to communicate with a remote device over the network 106.

FIG. 6 illustrates another exemplary method for facilitating randomized port allocation according to an exemplary embodiment of the present invention. In this regard, FIG. 6 illustrates operations that may occur at a network management entity 104. The method optionally includes the port allocation unit 126 receiving a request from a host device 102 requesting allocation of a network address to the host device 102, at operation 600. Operation 610 comprises the port allocation unit 126 allocating a network address to the host device. The port allocation unit 126 may then generate an encryption key, at operation 620, and associate the encryption key with the network address, at operation 630, if an encryption key has not previously been generated and associated with the network address allocated to the host device 102. Operation 640 then comprises the port allocation unit 126 allocating a plurality of random ports to the host device 012 using a cryptographic mechanism as described herein. Operation 650 comprises the port allocation unit 126 sending a port allocation message to the host device 102. The port allocation message may comprise an encryption key, an initial input value, and a value indicating a number of ports allocated to the host device 102 to enable the host device 102 to calculate the allocated ports. The port allocation message may further comprise a network address allocated to the host device 102. Operation 660 may optionally comprise the port allocation unit 126 generating or updating a port allocation table for the network address to include the ports allocated to the host device 102 by calculating those ports allocated to the host device 102 using the predefined encryption function.

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and network providers. Embodiments of the invention facilitate randomized port allocation so as to inhibit blind attacks, even in networks where host devices are issued port-restricted network addresses shared among multiple network devices. The randomly allocated ports are cryptographically random ports, rather than easily predictable source ports within a continuous range of ports, which are more vulnerable to blind attacks. Further, embodiments of the invention enable allocation of random ports to a network host with a relatively small message size such that a host device only needs an indication of the inputs to the encryption function to enable the host device to calculate the ports allocated to the host device.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
   at least one processor; and
   at least one memory including computer program code, the at least one memory and computer program code configured to, with the at least one processor, cause the apparatus to at least:
   receive, from a server, a port allocation message comprising an encryption key, an indication of an initial port value, and a value indicating a total number of random ports allocated to the apparatus for communication on a network, wherein the random ports allocated to the apparatus comprise a plurality of non-contiguous ports; and
   calculate, based at least in part upon the encryption key and the initial port value, at least one other port value from among the random ports allocated to the apparatus, with an encryption function.

2. The apparatus according to claim 1, wherein the apparatus is further caused to at least:
   communicate with a remote device using the at least one other port value.

3. The apparatus according to claim 1, wherein the apparatus is further caused to at least:
   determine an offset value such that the offset value is greater than or equal to zero and less than the value indicating the total number of the random ports allocated to the apparatus; and
   calculate an input value by adding the determined offset value to the initial port value, wherein the calculation of the at least one other port value uses the encryption key and calculated input value as inputs for the encryption function.

4. The apparatus according to claim 1, wherein the apparatus is further caused to at least:
   send a dynamic host configuration protocol request for a port-restricted network address to a dynamic host configuration protocol server, wherein the port allocation message comprises a dynamic host configuration protocol response to the dynamic host configuration protocol request, the dynamic host configuration protocol response comprising the port-restricted network address.

5. The apparatus according to claim 1, wherein the port allocation message further comprises an indication of a selection of the encryption function.

6. An apparatus, comprising:
   at least one processor; and
   at least one memory including computer program code, the at least one memory and computer program code configured to, with the at least one processor, cause the apparatus to at least:
   generate an encryption key;
   associate the encryption key with a network address allocated to a host device;
   allocate a plurality of random ports to the host device for use with the network address, the plurality of random ports including an initial port value and a plurality of non-contiguous ports; and
   send, to the host device, a port allocation message comprising the encryption key, an indication of the initial port value, and a value indicating a total number of the plurality of random ports allocated to the host device, the port allocation useable by the host device to calculate at least one other port value from among the plurality of random ports allocated to the host device.

7. The apparatus according to claim 6, wherein the network address comprises a port-restricted shared network address, and wherein none of the plurality of random ports coincide with ports allocated to a second host device with which the host device is sharing the port-restricted shared network address.

8. The apparatus according to claim 7, wherein the allocation of the plurality of random ports is based on determining the initial port value, such that for any offset value selected from a range of values greater than or equal to zero and less than the total number of the plurality of random ports, a value resulting from adding the offset value to the initial port value does not coincide with a value of the ports allocated to the second host device.

9. The apparatus according to claim 6, wherein the apparatus is further caused to at least:
   sequentially calculate, based on an encryption function using the encryption key, values for each of the plurality of random ports, each integer input value for the encryption function sequentially selected from a range of integer values greater than or equal to the initial port value and less than a sum of the initial port value and the total number of the plurality of random ports allocated to the host device; and store, in association with the host device, each of the calculated values in a port allocation table stored in the at least one memory.

10. The apparatus according to claim 6, wherein the apparatus comprises and/or is comprised in a dynamic host configuration protocol server, and wherein the apparatus is further caused to at least:

receive a dynamic host configuration protocol request for a port-restricted network address; and send the port allocation message by sending a dynamic host configuration protocol response to the dynamic host configuration protocol request, the dynamic host configuration protocol response comprising the port-restricted network address.

11. The apparatus according to claim 6, wherein the port allocation message further comprises an indication of an encryption function useable by the host device to calculate values for the plurality of random ports allocated to the host device.

12. The apparatus according to claim 6, wherein the apparatus is further caused to at least:

determine an encryption function, wherein the plurality of random ports allocated to the host device are calculable, based at least in part upon the encryption key and the indication of the initial port value, with the determined encryption function.

13. A computer program product comprising at least one non-transitory computer-readable storage medium having computer-readable program instructions stored therein, the computer-readable program instructions comprising:

receiving, from a server, a port allocation message comprising an encryption key, an indication of an initial port value, and a value indicating a total number of random ports allocated for communication on a network, wherein the random ports comprise a plurality of non-contiguous ports; and calculating, based at least in part upon the encryption key and the initial port value, at least one other port value from among the random ports, with an encryption function.

14. A computer program product comprising at least one non-transitory computer-readable storage medium having computer-readable program instructions stored therein, the computer-readable program instructions comprising:

generating an encryption key;

associating the encryption key with a network address allocated to a host device;

allocating a plurality of random ports to the host device for use with the network address, the plurality of random ports including an initial port value and a plurality of non-contiguous ports; and sending, to the host device, a port allocation message comprising the encryption key, an indication of the initial port value, and a value indicating a total number of the plurality of random ports allocated to the host device, the port allocation useable by the host device to calculate at least one other port value from among the plurality of random ports allocated to the host device.

15. A method comprising:

receiving, from a server, a port allocation message comprising an encryption key, an indication of an initial port value, and a value indicating a total number of random ports allocated for communication on a network, wherein the random ports comprise a plurality of non-contiguous ports; and calculating, based at least in part upon the encryption key and the initial port value, at least one other port value from among the random ports, with an encryption function.

16. The method according to claim 15, wherein calculating the at least one allocated port comprises:

determining an offset value such that the offset value is greater than or equal to zero and less than the value indicating the total number of the random ports allocated; and calculating an input value by adding the determined offset value to a value of the initial port value, wherein the calculating the at least one other port value uses the encryption key and calculated input value as inputs for the encryption function.

17. The method according to claim 15, further comprising:

sending a dynamic host configuration protocol request for a port-restricted network address to a dynamic host configuration protocol server, wherein the port allocation message comprises a dynamic host configuration protocol response to the dynamic host configuration protocol request, the dynamic host configuration protocol response comprising the port-restricted network address.

18. The method according to claim 15, wherein the port allocation message further comprises an indication of a selection of the encryption function.

19. A method comprising:

generating an encryption key;

associating the encryption key with a network address allocated to a host device;

allocating a plurality of random ports to the host device for use with the network address, the plurality of random ports including an initial port value and a plurality of non-contiguous ports; and sending, to the host device, a port allocation message comprising the encryption key, an indication of the initial port value, and a value indicating a total number of the plurality of random ports allocated to the host device, the port allocation message useable by the host device to calculate at least one other port value from among the plurality of random ports allocated to the host device.

20. The method according to claim 19, wherein allocating the plurality of random ports comprises determining the initial port value, such that for any offset value selected from a range of values greater than or equal to zero and less than the total number of the plurality of random ports, a value resulting from adding the offset value to the initial port value does not coincide with a value of the ports allocated to a second host device.

21. The method according to claim 19, further comprising:

determining an encryption function, wherein the plurality of random ports allocated to the host device are calculable, based at least in part upon the encryption key and the indication of the initial port value, with the determined encryption function.

* * * * *